United States Patent Office 3,836,657
Patented Sept. 17, 1974

3,836,657
ANTIFUNGAL METHODS EMPLOYING CERTAIN CARBOSTYRILS
John C. Sharp, Kalamazoo, Mich., assignor to The Upjohn Company, Kalamazoo, Mich.
No Drawing. Filed Mar. 20, 1972, Ser. No. 236,201
Int. Cl. A01n 9/22
U.S. Cl. 424—258                           16 Claims

ABSTRACT OF THE DISCLOSURE

Certain carbostyril compounds have been found to be active against fungi. When the compounds were applied to soil where seedling plants were growing or to the plants themselves, the plants were protected from pathogenic fungi that cause powdery mildew, e.g., Erisyphe cichoracearum and other fungal pathogens of plants. The compounds are prepared by known chemical processes. A new method for controlling fungi and new formulations are described.

SUMMARY OF THE INVENTION

This invention pertains to a new method for controlling fungi, and new formulations for that purpose. The invention is more particularly directed to a new method for controlling fungi with a limited class of substituted carbostyrils, and new formulations comprising the compounds as the characterizing active ingredient. The invention is even more particularly directed to controlling fungal pathogens of plants with substituted carbostyrils having the general formula

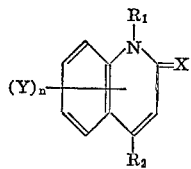

wherein $R_1$ and $R_2$ are hydrogen, methyl, ethyl, propyl, isopropyl, butyl, isobutyl, sec.butyl, and tert.butyl; X is oxygen or sulfur; Y is lower-alkyl of from 1 to 3 carbon atoms, inclusive, lower-alkoxy of from 1 to 3 carbon atoms, inclusive, halogen, or nitro when $R_1$ is methyl; and $n$ is an integer 0, 1, 2, 3, or 4—providing, however, that there may be only one nitro group in the molecule; $R_2$ must be hydrogen when $R_1$ is ethyl, propyl, or isopropyl; $R_2$ is preferably methyl when $R_1$ is hydrogen; $n$ is preferably 1, 2, 3, or 4 when $R_1$ is hydrogen; and $n$ is 1, 2, 3, or 4 preferably 2, 3, or 4 when both $R_1$ and $R_2$ are hydrogen.

The substituted carbostyrils thus defined are active against fungi. They can be used to kill, abate, quench, stifle, and otherwise control fungal organisms. Effective action has been found against Alternaria, Monilinia fructicola, Phythium, Sclerotium rolfsil, Helminthosporium, Fusarium solani, Verticillium, Rhizoctonia solani, Botrytis cinerea, Uromyces Phaseoli, and Erisyphe cichoracearum. The compounds are prospectively useful for control of powdery mildew on apples, apple scab, powdery mildew on cucurbits, and cherry leafspot.

In representative tests wherein the compounds 1,4-dimethylcarbostyril; 1,4,6-trimethylcarbostyril; 4,8-dimethylcarbostyril; 4,5,8-trimethylcarbostyril; 8-ethyl-4-methylcarbostyril; 1 - ethyl-6-methylcarbostyril, and 4,7,8-trimethylcarbostyril were applied to soil at rates of 5 lbs. and 10 lbs. per acre, there was 100% control of the fungus Erisyphe cichoracearum (which causes powdery mildew).

A representative test against powdery mildew is effected by dispersing a 50% wettable powder of a substituted carbostyril according to the invention in water. The wettable powder comprises a finely divided clay and one or more surface active agents besides the active ingredient. By appropriately dispersing an amount of the wettable powder in water, test concentrations of the active ingredient are obtained, e.g., 9.6 mg. per ml., 4.8 mg. per ml., 2.4 mg. per ml. and so forth. A volume of the aqueous dispersion is used, e.g., 25 ml. on the soil in a 5" clay pot that will provide a desired per acre rate of application, e.g., 5, 10, 20, or more lbs. per acre. The plants protected in the tests are susceptible ones such as squash, cucumbers, and pumpkins that are about 2 weeks old. The test plants are observed for example at 3, 5, 7, 9, 11, 14, and 21 days.

DETAILED DESCRIPTION OF THE INVENTION

The antifungal substituted carbostyrils of this invention are known in general, and they can be prepared by conventional chemical syntheses generally known. Illustratively, 4-methylcarbostyrils according to Formula I are prepared by reacting an appropriate aniline with diketene to produce an acetoacetanilide intermediate that is in turn cyclized according to the method described by E. E. Kaslow and D. J. Cook, J. Am. Chem. Soc. 67, p. 1969 (1945).

In accordance with this method, any of a great variety of known anilines can be used. Representative ones are N-methylaniline, N-methyl-o-toluidine, m-toluidine, N-ethylaniline, N-isopropylaniline, N-propylaniline, 3,4-xylidene, 2,3-xylidine, 3,5-xylidine, o-ethylaniline, p-ethylaniline, o-isopropylaniline, p-isopropylaniline, o-propylaniline, 2-amino-4-isopropyl-1-methylbenzene, 2-amino-4-isopropyl - 1 - methylbenzene, 1-amino-2,4,5-trimethylbenzene. Other substituted anilines, i.e., substituted aminobenzenes can be used.

The same 4-methylcarbostyrils according to Formula I are also prepared by reacting anilines of the kind represented above with an alkyl acetoacetate, e.g., methyl or ethyl acetoacetate according to the method described by C. R. Hauser and G. A. Renolds, J. Am. Chem. Soc. 70, p. 2402 (1948). The method produces initially an intermediate acetoacetanilide which is cyclized with sulfuric or polyphosphoric acid to give the desired 4-methylcarbostyril.

As between these two reactions, the diketene reaction is preferred, because yields are more readily quantitative and there are a minimum of side-reaction products. The alkyl acetoacetate reaction can produce numerous side-reaction products and thus lower yields.

A variation of the alkyl acetoacetate synthesis will produce the compounds of Formula I wherein $R_2$ is ethyl, propyl, or isopropyl. When these variants are desired, an aniline is reacted with, for example, ethyl propionylacetate, ethyl butyrylacetate, or ethyl isobutyrylacetate, respectively.

N-Substituted carbostyrils according to Formula I are prepared by alkylating a quinoline and then oxidizing the thus obtained quaternary ammonium salt with potassium ferricyanide solution in sodium hydroxide solution. When the selected quinoline has an alkyl group in the 8-position, it will be less easily alkylated than otherwise. The foregoing method is exemplified in Ireland Pat. No. 762/63 published Aug. 9, 1963.

The thiocarbostyrils according to Formula I are prepared from corresponding carbostyrils by conventional thiation with phosphorous pentasulfide.

More specific preparations can be described as follows:

When the preferred diketene reaction is used, 0.2 mole of an aniline is warmed to 60° C. and 0.24 mole diketene is added dropwise with stirring (the diketene can be added as a 50% solution in acetone). This reaction mixture is heated on a steam bath for 2 hrs. Any solvents still remaining are removed by further evaporation (under reduced pressure if desired). The mixture is then cooled in order to cause crystallization of the acetoacetanilide thus produced.

In order to cyclize the acetoacetanilide obtained as above, it is added with stirring to concentrated sulfuric acid or polyphosphoric acid in proportions of about 1 g. to 4 g. and this reaction mixture is heated on a steam bath for 30 min. Alternatively, the mixture can be heated at a temperature in the range of 100° to 150° C. for 1 to 3 hrs. The hot reaction mixture is cooled to about 60° C. and then poured into a mixture of crushed ice and water. The cooled aqueous mixture is then adjusted carefully to pH 7 with sodium hydroxide. The desired carbostyrils are in this way precipitated or separated as oils. They can be recovered by filtration or by extraction with an organic solvent, e.g., methylene chloride. The carbostyrils are washed with water and dried; they can be further purified by conventional techniques such as recrystallization, distillation, or chromatography.

When the alkyl alkanoacetate synthesis is used, equimolar amounts of an aniline and, e.g., ethyl acetoacetate are heated at the reflux temperature for 20 to 30 minutes. This reaction mixture is then cooled and the desired alkanoacetanilide recovered on a filter. Recrystallization from ethanol affords a relatively pure alkanoacetanilide. In some instances an objectionably high yield of a high melting N,N-bis-phenylurea was encountered.

When N-alkylcarbostyrils are to be prepared via the alklation of a quinoline, a chloroform solution of 0.2 mole of a quinoline and 0.3 mole of the alkylating reagent, e.g., alkylbromide or iodide, is heated at the reflux temperature until the reaction is completed. The chloroform is then removed by evaporation, and the semi-solid thus obtained is washed with, for example, diethyl ether to give the desired quaternary ammonium salt intermediate. The salt intermediate is dissolved in water (0.2 mole per 200 ml. water) and the aqueous solution is added to a cooled solution consisting of 100 g. potassium ferricyanide, 400 ml., water, and 1 l. of 5% sodium hydroxide. The reaction temperature is maintained below 5° C. during the addition. When reaction is complete, the reaction mixture is allowed to warm to 10° C. and the desired carbostyril is extracted with several chloroform washes. The chloroform extracts are combined, washed with water, dried over anhydrous sodium sulfate, and the chloroform is removed by evaporation. The resulting carbostyril can be purified by conventional techniques such as recrystallization or chromatography.

Thiocarbostyrils according to Formula I are prepared by heating at the reflux temperature equivalent amounts of a carbostyril and phosphorus pentasulfide. A two hour reaction time is usually adequate. The reaction mixture is poured into ice water and extracted several times with methylene chloride. The methylene chloride extracts are combined, washed with water, dried over anhydrous sodium sulfate, and the solvent is removed by evaporation under reduced pressure. The solid thiocarbostyrils thus obtained can be purified by recrystallization from technical hexane or ethanol.

The nitrocarbostyrils according to Formula I are prepared by adding 40 ml. of fuming nitric acid to 5 g. of a carbostyril while the temperature is kept at 0° C. Stirring is continued for 30 min. while the reaction mixture warms to 10° C. The reaction mixture is then poured into a mixture of crushed ice and water. The aqueous mixture is then extracted with several portions of methylene chloride. The extracts are combined, dried over anhydrous sodium sulfate, and the solvent is removed by evoporation under reduced pressure. The nitrocarbostyril thus obtained is purified by recrystalliztion from solvents or by chromatographic techniques.

A principal objective of this invention is to provide a new method for killing and controlling fungi wherever the microorganisms are found. The method of the invention is not limited as to locale of the target fungi, and the new method is applicable to various situs, objects of all types, animals, and plants. The new method is broadly accomplished by contacting the fungi with the newly recognized antifungal compounds wherever undesired fungi are causing a problem.

A further main object of the invention is to provide new formulations for killing and controlling fungi. The preferred kind of formulations are dispersible ones that lend themselves to even distribution over areas where an undesired fungus is infective or potentially infective. In this general embodiment of the invention liquid dispersible carriers can be used, but solid pulverulent carriers are sometimes preferred. Ofttimes, adjuvants such as surface active agents, dispersants, and adhesive or sticking agents are included.

The novel formulations of the invention are used to kill and control fungi on organic matter such as wood, cellulosic fibers, leather, seeds, fruits, vegetables, living plants, and on various animals, for example, fishes, reptiles, birds, cattle, horses, dogs, and cats. When an undesired fungus is causing a problem, one merely contacts the microorganism with an effective amount of one or more active compounds of the invention and utilizing one of the conventional techniques known to those skilled in the art.

Living plants have been protected in accordance with the new method of this invention by spraying a solution of the compounds on the plants themselves or on the soil proximate to where the plants are growing and within reach of the root systems. The active compounds are apparently absorbed by the root hairs and systemically transported throughout the plant so as to prevent damage by fungal pathogens.

The substituted carbostyrils of Formula I can be used as antifungal agents in pure form, as technical grade chemicals, as crude preparations, or as formulations with solid and liquid carriers with or without adjuvants. In general, the interest of practical modes of applications and economics are best served by the formulations of the invention. The pure active compounds (including mixtures thereof) or the formulations can be applied to fungi, objects, or a situs for preventing fungal growth and propagation. The antifungal formulation of this invention include dispersions in powder and granular carriers, e.g., dusts and granules; dispersions in liquid carriers, e.g., true solutions, suspensions and emulsifiable concentrate; smokes and aerosols; emulsions, e.g., creams and ointments; and capsules and tablets.

Most of the substituted carbostyrils according to Formula I are solids at commonly experienced temperatures and they can be readily formulated as dusts by grinding a mixture of the compound and a pulverulent carrier in the presence of each other. Grinding is conveniently accomplished in a ball mill, a hammer mill, or by air-blast micronization. A suitable ultimate particle size is less than 60 microns. Preferably, 95% of the particles are less than 50 microns, and about 75% are 5 to 20 microns. Dusts of that degree of comminution are conveniently free-flowing and can be applied to animals, inaminate matter, fruit trees, crop plants, and soil so as to effect thorough distribution and coverage. Dusts are particularly adapted for effectively controlling plant fungi over wide areas when applied by airplane. They are also indicated for application to the undersides of plant foliage and to the skin of hairy animals.

Representative suitable pulverulent carriers include the natural clays such as China, Georgia Barden, attapulgus, kaolin, and bentonite clays; minerals in their natural forms as they are obtained from the earth such as talc, pyrophyllite, quartz, diatomaceous earth, fuller's earth, chalk, rock phosphates and sulfates, calcium carbonates, sulfur, silica and silicates; chemically modified minerals such as washed bentonite, precipitated calcium phosphate, precipitated calcium carbonate, precipitated calcium silicate, synthetic magnesium silicate, and colloidal silica; and organic flours such as wood, walnut shell, soybean, cottonseed, and tobacco flours, and free-flowing, hydrophobic starches.

Dusts can also be prepared by dissolving the active compounds in a volatile solvent such as methylene chloride, mixing the solution with a pulverulent carrier and evaporating the solvent before grinding to particulate dimensions.

The proportions of pulverulent carrier and active compound can vary over a wide range depending upon the fungi to be killed or controlled and the conditions of treatment. In general, dust formulations can contain up to about 90% (on a weight basis) of the active ingredient. Dusts having as little as 0.001% of the active ingredient can be used, but a generally preferred proportion is from about 0.50% to about 20% of active ingredient.

The dispersible powder formulations of this invention are prepared by incorporating a surface active agent in a dust composition prepared as described above. When about 0.1% to about 12% of such agent is incorporated in a dust, the dispersible powder thus obtained is particularly adapted for further admixture with water for spraying on inaminate matter and products, fruit trees, field crops, soil, and livestock. The dispersible powders can be admixed with water to obtain any desired concentration of active ingredient, and the mixture can be applied in amounts sufficient to obtain predetermined rates of application and uniform distribution. With this flexibility in mind, the dispersible powders of the invention can conveniently comprise preferably about 10% to about 80% of active ingredient.

Representative surface active agents useful for preparing dispersible powder formulations of this invention include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohol, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. The preferred class of surfactants includes blends of sulfonated oils and polyalcohol carboxylic acid esters (Emcol H–77), blends of polyoxyethylene ethers and oil-soluble sulfonates (Emol H–400), blends of alkyl aryl sulfonates and alkylphenoxy polyethoxy ethanols (Tritons X–151, X–161, and X–171), e.g., about equal parts of sodium kerylbenzene sulfonate and isooctylphenoxy polyethoxy ethanol containing about 12 ethoxy groups, and blends of calcium alkyl aryl sulfonates and polyethoxylated vegetable oils (Agrimul $N_4S$). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 327 lbs. of Georgia Clay, 5.0 lbs. of isooctylphenoxy polyethoxy ethanol (Triton X–100) as a wetting agent, 10 lbs. of a polymerized sodium salt of substituted benzoid long-chain sulfonic acid (Daxad 27) as a dispersing agent, and 340 lbs. of the active ingredient. The resulting formulation has the following percentage composition (parts herein are by weight unless otherwise specified):

| | Percent |
| --- | --- |
| Active ingredient | 50.00 |
| Isooctylphenoxy polyethoxy ethanol | 0.75 |
| Polymerized sodium salt of substitued benzoid long-chain sulfonic acid | 1.25 |
| Georgia Clay | 48.00 |

This formulation, when dispersed in water at the rate of 10 lbs. per 100 gals., gives a spray formulation containing about 0.6% (6000 p.p.m.) active ingredient which can be applied to fungus infected soil, plants, or turf at the rate of 40 gals, per acre to give a total application of active ingredient of 2 lb. per acre.

If desired, dispersants such as methyl cellulose, polyvinyl alcohol, sodium ligninsulfonates, and the like can be included in the dispersible powder formulations of this invention. Adhesive or sticking agents such as vegetable oils, naturally occurring gums, casein, and others can also be included. Corrosion inhibitors such as epichlorohydrin and antifoaming agents such as stearic acid can also be included.

The granular formulations according to this invention are prepared by permeating a granular carrier with a solution of a substituted carbostyril according to Formula I and then drying the granules. Suitable granular carriers include vermiculite, expanded vermiculite, pyrophyllite, and attapulgite. Suitable solvents include acetone, methyl ethyl ketone, and methylene chloride. A solution of, for example, 4,5,8-trimethylcarbostyril is sprayed on a granular carrier while the carrier is being mixed and tumbled. The granules are then dried. The granules can range in size from about 10 to about 60 mesh, preferably about 30 to 60 mesh.

The antifungal substituted carbostyrils of this invention can be applied to fungi, objects, or a situs in aqueous sprays without a solid carrier. Since, however, many of the compounds themselves (particularly the free bases) are relatively insoluble in water, such compounds are preferably dissolved in a suitable inert organic solvent carrier. Advantageously, the solvent carrier is immiscible with water so that an emulsion of the solvent carrier in water can be prepared. If, for example, a water-miscible solvent carrier such as ethanol is used the solvent carrier will dissolve in the water and any excess substituted carbostyril will be thrown out of solution. In an oil-in-water emulsion, the solvent phase is dispersed in the water phase and the dispersed phase contains the active ingredient. In this way, uniform distribution of a water insoluble active ingredient is achieved in an aqueous spray. A solvent carrier in which the compounds are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for preventing fungal growth and propagation.

The emulsifiable concentrates of the invention are prepared, therefore, by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed, if desired.

Advantageously, the concentration of active ingredient in the emulsifiable concentrates can range from about 5% to about 50% by weight, preferably from about 10% to about 40%. A concentrate comprising 20% (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20% concentrate mixed with 40 gals. of water provides about 1200 p.p.m. (parts per million) of active ingredient. In the same manner, more concentrated solutions of active ingredient can be prepared.

The concentrate formulations of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium ligninsulfonate, and the like.

The rates of application of fungi, objects or situs will depend upon the species of fungi to be controlled, the presence or absence of desirable living organisms, temperature conditions of treatment, and the method and efficiency of application. In general, fungicidal activity is obtained when the compounds are applied at concentrations of about 10 to about 6000 p.p.m., preferably at concentrations of about 100 to about 1200 p.p.m.

The compositions containing substituted carbostyrils according to the invention, can be applied by conventional methods to fungi, objects or any situs where control of fungi is desired. For example, an area of soil or plants can be treated by spraying wettable powder suspensions, emulsions, or solutions from boom-type power sprayers or from hand-operated knapsack sprayers. Dusts can be applied by power-dusters, or by hand-operated dusters. Creams and ointment formulations can be applied to skin or objects for prolonged protection against the microorganisms.

The following examples are illustrative of the method and formulations of the invention but are not to be construed as limiting.

Example 1

A dispersible powder concentrate having the following percentage composition:

| | Percent |
|---|---|
| 1,4-dimethylcarbostyril | 45.8 |
| Polymerized sodium salt of substituted benzoid long-chain sulfonic acid (Daxad 27) | 9.2 |
| Kaolinite | 45.0 | was prepared by mixing 250 gm. 1,4-dimethylcarbostyril, 50 gm. of a polymerized sodium salt of substituted benzoid long-chain sulfonic acid (Daxad 27), and 245 gm. of kaolinite. The mixture was milled to a particle size averaging 5 to 30 microns. It was suspended in 10 gals. of water, giving an aqueous spray containing about 6500 parts per million of active ingredient.

Example 2

A fine granular formulation having the following percentage composition:

| | Percent |
|---|---|
| 1,4,6-trimethylcarbostyril | 3.7 |
| Expanded vermiculite (30/60 mesh) | 96.3 | was prepared by spraying a solution of 220 gm. of 1,4,6-trimethylcarbostyril in 1000 ml. of methylene chloride on 5780 gm. of expanded vermiculite (30 to 60 mesh) while the vermiculite was being tumbled and stirred so as to assure even distribution. The methylene chloride was then evaporated, leaving 1,4,6-trimethylcarbostyril adsorbed on the vermiculite particles, and the vermiculite was pulverized.

Example 3

An emulsifiable concentrate having the following percentage composition:

| | Percent |
|---|---|
| 4,8-dimethylcarbostyril | 15.0 |
| Technical alkyl naphthalene boiling at 238° to 293° C. (Velsicol AR50) | 19.7 |
| Xylene | 17.4 |
| Isopropanol | 17.4 |
| Ethylene dichloride | 25.4 |
| Blend of alkyl aryl sulfonates and alkylphenoxy polyethoxy ethanols (Triton X-151) | 5.1 | was prepared by mixing 15.0 lbs. of 4,8-dimethylcarbostyril, 19.7 lbs. of Velsicol AR50, 17.4 lbs. of xylene, 17.4 lbs. of isopropanol, 25.4 lbs. of ethylene dichloride, and 5.1 lbs. of Triton X-151.

6.67 lbs. of the concentrate mixed with 10 gal. of water gave a spray emulsion containing 11,000 p.p.m. of 4,8-dimethylcarbostyril.

Example 4

An emulsifiable concentrate having the following percentage composition:

| | Percent |
|---|---|
| 4,5,8-trimethylcarbostyril | 40.0 |
| Technical alkyl naphthalene boiling at 238° to 293° C. (Velsicol AR50) | 13.7 |
| Xylene | 12.3 |
| Isopropanol | 11.3 |
| Ethylene dichloride | 17.7 |
| Blend of alkyl aryl sulfonates and alkylphenoxy polyethoxy ethanols (Triton X-151) | 5.0 | was prepared by mixing 40.0 lbs. of 4,5,8-trimethylcarbostyril, 13.7 lbs. of Velsicol AR50, 12.3 lbs. of xylene, 11.3 lbs. of isopropanol, 17.7 lbs. of ethylene dichloride, and 5.0 lbs. of Triton X-151.

1.67 lbs. of the concentrate mixed with 10 gals. of water gave a spray emulsion containing 8,000 p.p.m. of 4,5,8-trimethylcarbostyril for control of fungi.

Example 5

A wettable powder concentrate having the following percentage composition:

| | Percent |
|---|---|
| 8-ethyl-4-methylcarbostyril | 50 |
| Kaolinite Clay (finely divided) | 46 |
| Sodium salt of condensed mononaphthalene sulfonic acid (Lomar D) | 4 | was prepared by mixing 50 g. of 8-ethyl-4-methylcarbostyril, 46 g. of the kaolinite clay, and 4 g. of Lomar D. The mixture was milled to an average particle size of 5 to 30 microns.

Example 6

A granular formulation having the following percentage composition:

| | Percent |
|---|---|
| 1-ethyl-6-methylcarbostyril | 1 |
| Pyrophyllite (30/60 mesh) | 99 | was prepared by dissolving 1.0 lb. of 1-ethyl-6-methylcarbostyril in 10.0 l. of ethylene dichloride and spraying the solution on 99.0 lbs. of pyrophyllite. The granules were dried and then packaged for use.

Example 7

An evaluation of the systemic efficacy of 4,7,8-trimethylcarbostyril against powdery mildew was made by applying the compound to the soil of potted healthy squash plants later inoculating the plants with viable conidia, and subsequently comparing the amount of infection on treated plants with similarly inoculated but untreated (control) squash plants.

In this test, squash plants at the trifoliate stage of growth in 3″ pots, were treated with 10 mg., 5 mg., and 2.5 mg. per pot of 4,7,8-trimethylcarbostyril. The plants were inoculated with conidia 3,8, and 14 days after treatment. Infection was established by spraying an aqueous inoculum on the foliage and keeping the plants in a greenhouse at about 70° F. Readings were made 6 to 7 days after the inoculation when conidial formation on the squash leaves was evident enough for visual comparative evaluation. Results were as follows (in terms of percentage control as compared with inoculated but untreated plants).

|  | Days (post-drench) | | |
| --- | --- | --- | --- |
|  | 3 | 8 | 14 |
|  | Percent | | |
| 10 mg | 100 | 100 | 100 |
| 5 mg | 50 | 100 | 100 |
| 2.5 mg | 15 | 75 | 10 |

These data show that 4,7,8-trimethylcarbostyril is rapidly absorbed and translocated by growing squash plants, and the powdery mildew is controlled. Similar efficacy is obtained with the other compounds of this invention, e.g., 1,4-dimethylcarbostyril,
1,4,6-trimethylcarbostyril,
1,4,7-trimethylcarbostyril,
1,4,8-trimethylcarbostyril,
1,4-dimethyl-6-nitrocarbostyril,
1,4,6-trimethyl-8-nitrocarbostyril,
4-methylcarbostyril,
4,6-dimethylcarbostyril,
4,8-dimethylcarbostyril,
4-methyl-6-methoxycarbostyril,
4-methyl-8-methoxycarbostyril,
4,5,8-trimethylcarbostyril,
4,6,8-trimethylcarbostyril,
4,7,8-trimethylcarbostyril,
4,8-dimethyl-7-chlorocarbostyril,
4-methyl-8-ethylcarbostyril,
1-ethylcarbostyril,
1-ethyl-6-methylcarbostyril,
1-ethyl-7-methylcarbostyril,
1-ethyl-8-methylcarbostyril,
1-ethyl-6-chlorocarbostyril,
1-ethyl-6-nitrocarbostyril,
1-ethyl-4-methylcarbostyril,
1-ethyl-4,6-dimethylcarbostyril,
1-ethyl-4,7-dimethylcarbostyril,
1-ethyl-4,8-dimethylcarbostyril,
1-n-propylcarbostyril,
1-methylcarbostyril,
thiocarbostyril,
1-methylthiocarbostyril,
1-ethylthiocarbostyril,
4-methylthiocarbostyril,
4,8-dimethylthiocarbostyril,
1,4-dimethylthiocarbostyril,
1,4,6-trimethylthiocarbostyril,
1,4,7-trimethylthiocarbostyril,
1-ethyl-4-methylthiocarbostyril,
1-ethyl-4,7-dimethylthiocarbostyril,
1-ethyl-4,8-dimethylthiocarbostyril,
1-n-propyl-4-methylthiocarbostyril,
1-n-butyl-4-methylthiocarbostyril,
1-n-butyl-4,6-dimethylthiocarbostyril.

In the general Formula I, halogen can be bromine, chlorine, iodine or fluorine. Likewise, lower-alkoxy of from 1 to 3 carbon atoms, inclusive, means methoxy, ethoxy, propoxy, and isopropoxy.

I claim:
1. A method of controlling fungi which comprises contacting fungi with an anti-fungal amount of a substituted carbostyril having the formula:

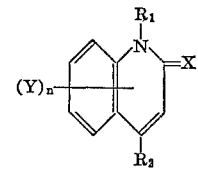

(I)

wherein $R_1$ and $R_2$ are hydrogen, methyl, ethyl, propyl, isopropyl, butyl, isobutyl, sec.butyl, or tert.butyl; X is oxygen or sulfur; Y is lower-alkyl of from 1 to 3 carbon atoms, inclusive, lower-alkoxy of from 1 to 3 carbon atoms, inclusive, halogen, or nitro when $R_1$ is methyl; and $n$ is an integer 0, 1, 2, 3, or 4—providing, however, that there may be only one nitro group in the molecule; $R_2$ must be hydrogen when $R_1$ is ethyl, propyl, or isopropyl; $R_2$ is methyl when $R_1$ is hydrogen; $n$ is 1, 2, 3, or 4 when $R_1$ is hydrogen; and $n$ is 1, 2, 3, or 4 when both $R_1$ and $R_2$ are hydrogen.

2. The method according to claim 1 wherein X is oxygen.
3. The method according to claim 2 wherein $R_1$ is hydrogen and $R_2$ is methyl.
4. The method according to claim 3 wherein $n$ is 1.
5. The method according to claim 3 wherein $n$ is 2.
6. The method according to claim 5 wherein Y is alkyl.
7. The method according to claim 6 wherein alkyl is methyl.
8. The method according to claim 7 wherein the compound is 4,5,8-trimethylcarbostyril.
9. The method according to claim 7 wherein the compound is 4,7,8-trimethylcarbostyril.
10. The method according to claim 2 wherein $R_1$ and $R_2$ are methyl.
11. The method according to claim 10 wherein Y is alkyl.
12. The method according to claim 11 wherein the compound is 1,4,7-trimethylcarbostyril.
13. The method according to claim 6 wherein the compound is 8-ethyl-4-methylcarbostyril.
14. The method according to claim 11 wherein the compound is 1,4,8-trimethylcarbostyril.
15. The method according to claim 11 wherein the compound is 1,4,6-trimethylcarbostyril.
16. The method according to claim 4 wherein Y is alkyl.

References Cited

UNITED STATES PATENTS 3,624,089  11/1971  Pawloski _____ 424—258
2,381,082  8/1945   Shinkle _____ 424—258

OTHER REFERENCES

Kaslow et al., J. Am. Chem. Soc., 67 (1945), pp. 1969–1972.

Hauser et al., J. Am. Chem. Soc. 70 (1948), pp. 2402–2404.

VINCENT D. TURNER, Primary Examiner

U.S. Cl. X.R.
260—283 S, 289 R